(12) United States Patent  
Pan

(10) Patent No.: US 7,410,360 B2  
(45) Date of Patent: Aug. 12, 2008

(54) SLIDE APPARATUS, SLIDE MODULE AND ELECTRONIC DEVICE UTILIZING THE SAME

(75) Inventor: Long-Jyh Pan, Taipei County (TW)

(73) Assignee: Qisda Corporation, Taoyuan (TW)

( * ) Notice: Subject to any disclaimer, the term of this patent is extended or adjusted under 35 U.S.C. 154(b) by 389 days.

(21) Appl. No.: 11/372,280

(22) Filed: Mar. 10, 2006

(65) Prior Publication Data

US 2006/0226151 A1 Oct. 12, 2006

(30) Foreign Application Priority Data

Mar. 14, 2005 (TW) .............................. 94107665 A

(51) Int. Cl.  
*H01R 39/00* (2006.01)
(52) U.S. Cl. ....................................................... 439/10
(58) Field of Classification Search .................. 439/10, 439/11, 13, 32, 372; 455/575.4, 575.1, 550.1; 361/490, 686; 345/164; 16/334  
See application file for complete search history.

(56) References Cited

U.S. PATENT DOCUMENTS

| 5,038,237 | A | * | 8/1991 | Kim | ......................... 360/96.51 |
| 5,539,167 | A | * | 7/1996 | Hood et al. | .................. 200/244 |
| 6,325,131 | B1 | * | 12/2001 | Dekker et al. | ............... 160/170 |
| 7,207,313 | B2 | * | 4/2007 | Torii | ........................... 123/396 |
| 7,252,511 | B2 | * | 8/2007 | Santos et al. | ................... 439/10 |
| 2005/0064919 | A1 | * | 3/2005 | An et al. | ................... 455/575.3 |
| 2006/0046796 | A1 | * | 3/2006 | Park et al. | ................. 455/575.4 |
| 2006/0068859 | A1 | * | 3/2006 | Lee et al. | .................. 455/575.4 |
| 2007/0006421 | A1 | * | 1/2007 | Park et al. | ....................... 16/334 |
| 2007/0249394 | A1 | * | 10/2007 | Bong Doo | ............... 455/556.1 |

* cited by examiner

*Primary Examiner*—Chandrika Prasad  
(74) *Attorney, Agent, or Firm*—Muncy, Geissler, Olds & Lowe, PLLC

(57) ABSTRACT

A slide apparatus includes two members and two slide modules. A second member is movable between a first position and a second position in relation to a first member, with a central position therebetween. The first and second slide modules are disposed on the first member and each includes a rotating structure and an elastic element. When the second member is between the first position and the central position, the first rotating structure is rotatable to generate or release a first torque in the first elastic element. When the second member is between the central position and the second position, the second rotating structure is rotatable to generate or release a second torque in the second elastic element.

20 Claims, 15 Drawing Sheets

SLIDE APPARATUS, SLIDE MODULE AND ELECTRONIC DEVICE UTILIZING THE SAME

BACKGROUND

The invention relates to a slide apparatus and a slide module and electronic device utilizing the same.

In recent years, portable electronic devices, such as digital cameras, cellular phones, and electronic dictionaries have become widely popular.

Frequently, portable electronic devices have an integral cover structure, often in configuration, hinged or sliding. An example of an electronic device, here a sliding cover cellular phone, is shown in FIG. 1A and FIG. 1B. The sliding cover cellular phone in FIG. 1A and FIG. 1B has a body 510 and a sliding cover 520. When the cellular phone is not in use, the sliding cover 520 assumes a closed position as shown in FIG. 1A to cover and protect at least part of the body 510. To use the cellular phone, the sliding cover 520 slides to an open position as shown in FIG. 1B to expose the body 510. When not in use, the sliding cover 520 returns to the closed position as shown in FIG. 1A.

In the above-mentioned electronic device, however, the sliding cover is manually operated, with external force required to move the sliding cover to the open or closed position. Thus, the electronic device is not convenient.

SUMMARY

Accordingly, an exemplary embodiment of a slide apparatus is provided. The slide apparatus comprises a first member, a second member, a first slide module, and a second slide module.

The second member is movable between a first position and a second position in relation to the first member, with a central position therebetween. The first slide module and the second slide module are disposed on the first member. The first slide module comprises a first rotating structure and a first elastic element, and the second first slide module comprises a second rotating structure and a second elastic element. The first rotating structure is rotatable only when the second member is between the first position and the central position and not between the central position and the second position. The first elastic element comprises a first end fixed to the first rotating structure and a second end fixed to the first member. The second rotating structure is not rotatable when the second member is between the first position and the central position, only when between the central position and the second position. The second elastic element comprises a third end fixed to the second rotating structure and a fourth end fixed to the first member. When the second member moves from the first position to the central position in relation to the first member by a first external force, the first rotating structure rotates to generate a first torque in the first elastic element, driving the second member from the central position to the first position. When the second member moves from the second position to the central position in relation to the first member by a second external force, the second rotating structure rotates to generate a second torque in the second elastic element, driving the second member from the central position to the second position.

Another embodiment of the invention discloses a slide apparatus. The slide apparatus comprises a first member, a second member and a torque-retaining assembly. The second member is movable between a first position and a second position in relation to the first member, with a central position therebetween. The torque-retaining assembly is disposed between the first member and the second member. When the second member moves from the first position to the central position in relation to the first member by a first external force, the torque-retaining assembly generates a first torque, driving the second member from the central position to the first position. When the second member moves from the second position to the central position in relation to the first member by a second external force, the torque-retaining assembly generates a second torque, driving the second member from the central position to the second position.

In the slide apparatus, the torque-retaining assembly comprises a first slide module and a second slide module disposed on the first member. The first slide module comprises a first rotating structure, a first supporting structure supporting the first rotating structure, and a first elastic element comprising a first end fixed to the first rotating structure and a second end fixed to the first supporting structure. The second slide module comprises a second rotating structure, a second supporting structure supporting the second rotating structure, and a second elastic element comprising a third end fixed to the second rotating structure and a fourth end fixed to the second supporting structure. When the second member is between the first position and the central position, the first rotating structure is rotatable and the second rotating structure is not, and when the second member is between the central position and the second position, the second rotating structure is rotatable and the first rotating structure is not.

In this case, when the second member moves from the first position to the central position in relation to the first member by a first external force, the first rotating structure rotates to generate the first torque in the first elastic element, driving the second member from the central position to the first position. When the second member moves from the second position to the central position in relation to the first member by a second external force, the second rotating structure rotates to generate the second torque in the second elastic element, driving the second member from the central position to the second position.

A further embodiment of the invention discloses an electronic device. The electronic device comprises a first member, a second member, a first slide module, a first sliding track, a second slide module, and a second sliding track. The second member is movable between a first position and a second position in relation to the first member, with a central position therebetween. The first slide module and the second slide module are disposed on the first member, each comprising a supporting structure, a gear and an elastic element. The first supporting structure comprises a first sliding notch, and the second supporting structure comprises a second sliding notch. The first and second sliding tracks are disposed on the second member corresponding to the first and second sliding notches. The first sliding track comprises a first track section and a second track section, and the second sliding track comprising a third track section and a fourth track section. The first track section comprises a first rack, and the fourth track section comprises a second rack. When the second member is between the first position and the central position in relation to the first member, the first gear corresponds to the first track section and engages the first rack, moving the first gear to the first free position, and the second gear corresponds to the third track section and is in the second limited position. When the second member is between the central position and the second position in relation to the first member, the first gear corresponds to the second track section and is in the first limited position, and the second gear corresponds to the fourth track section and engages the second rack, moving the second gear to the second free position.

A further embodiment of the invention discloses a slide module. The slide module comprises a supporting structure, a rotating structure and an elastic element. The supporting structure comprises a limiting portion and a guide groove. The rotating structure is disposed in the supporting structure and movable between a limited position and a free position along the guide groove. The rotating structure is not rotatable when limited by the limiting portion and in the limited position and is rotatable when the rotating structure is in the free position. The elastic element comprises one end fixed to the rotating structure and the other end fixed to the supporting structure.

In the slide apparatus and electronic device, the first and second members can alternatively be a body and a sliding cover.

A detailed description is given in the following embodiments with reference to the accompanying drawings.

DESCRIPTION OF THE DRAWINGS

The invention can be more fully understood by reading the subsequent detailed description in conjunction with the examples and references made to the accompanying drawings, wherein.

DETAILED DESCRIPTION

An embodiment of a slide apparatus is hereinafter described with respect to FIG. 2A, FIG. 2B and FIG. 2C. The slide apparatus comprises a first member 10 and a second member 20, both of which are relatively movable. The second member 20 is movable between a first position and a second position in relation to the first member 10, with a central position therebetween. The first position and the second position can alternatively be an open position and a closed position. For example, when the second member 20 in FIG. 2A is in the first position (the closed position), the second member 20 in FIG. 2B is in the central position, and the second member 20 in FIG. 2C is in the second position (the open position).

Further, a torque-retaining assembly is disposed between the first member 10 and the second member 20. When the second member 20 moves from the first position (as shown in FIG. 2A) to the central position (as shown in FIG. 2B), or moves from the second position (as shown in FIG. 2C) to the central position in relation to the first member 10 by an external force, the torque-retaining assembly generates torque, driving the second member 20 from the central position to the first position or the second position.

Figure 1A:
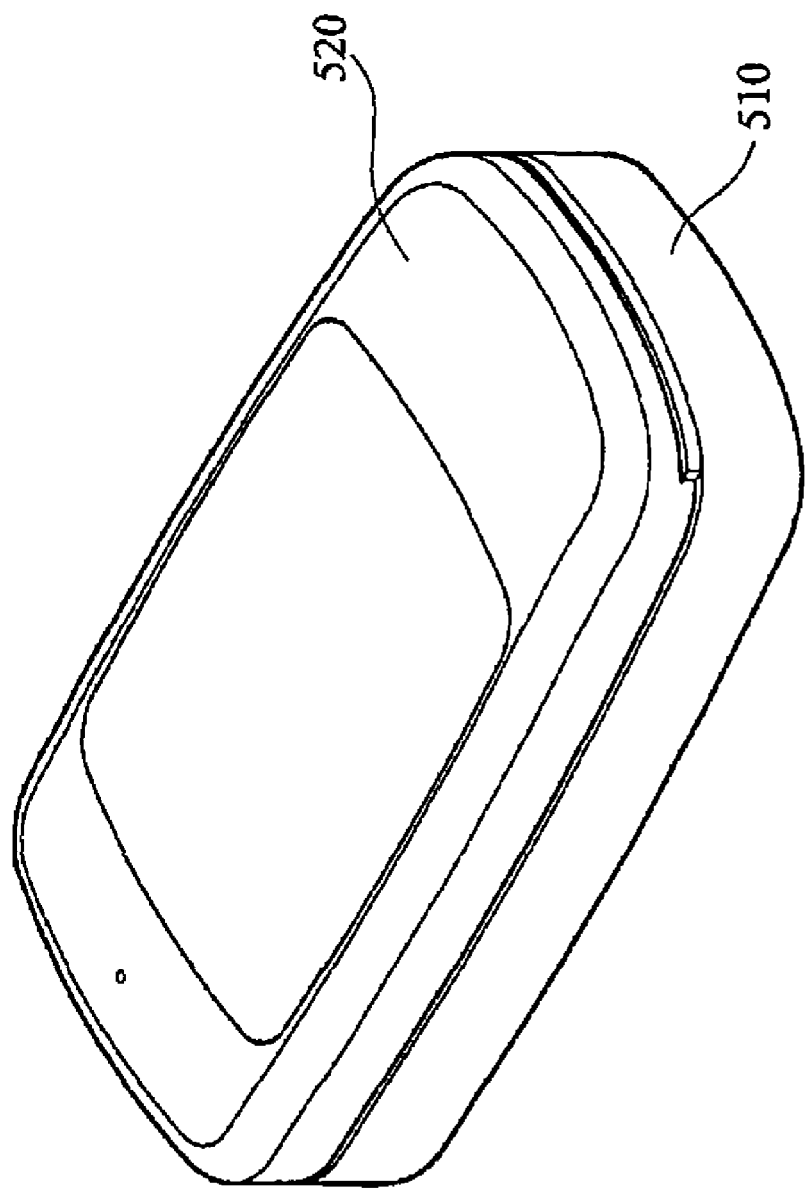
FIG. 1A is a schematic view of a conventional electronic device with the sliding cover closed.
Figure 1B:
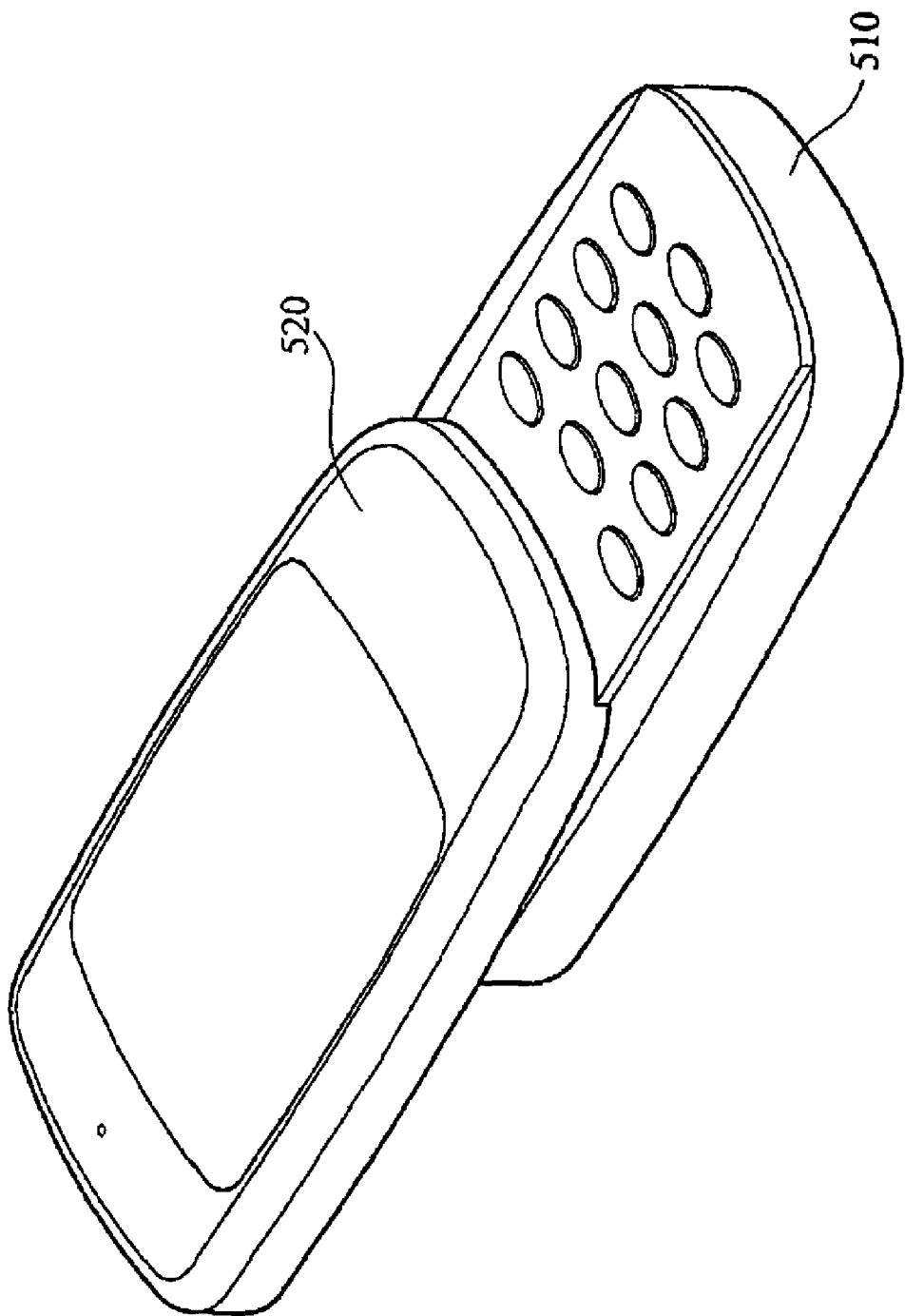
FIG. 1B is a schematic view of a conventional electronic device with the sliding cover open.
Figure 2A:
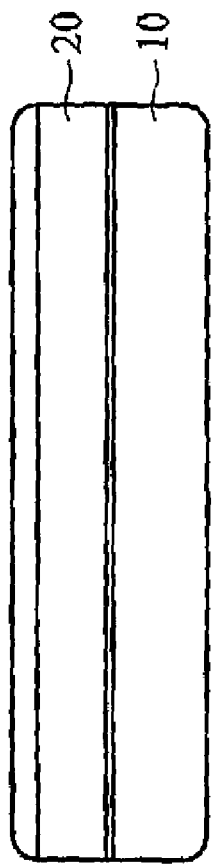
FIG. 2A is a schematic view of a slide apparatus of an embodiment of the invention with the second member in the first position.
Figure 2B:
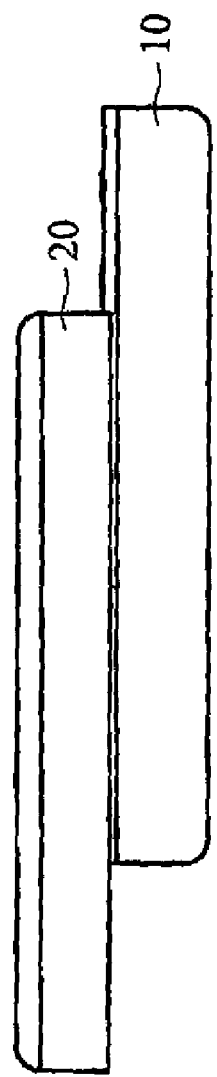
FIG. 2B is a schematic view of the slide apparatus in FIG. 2A with the second member in the central position.
Figure 2C:
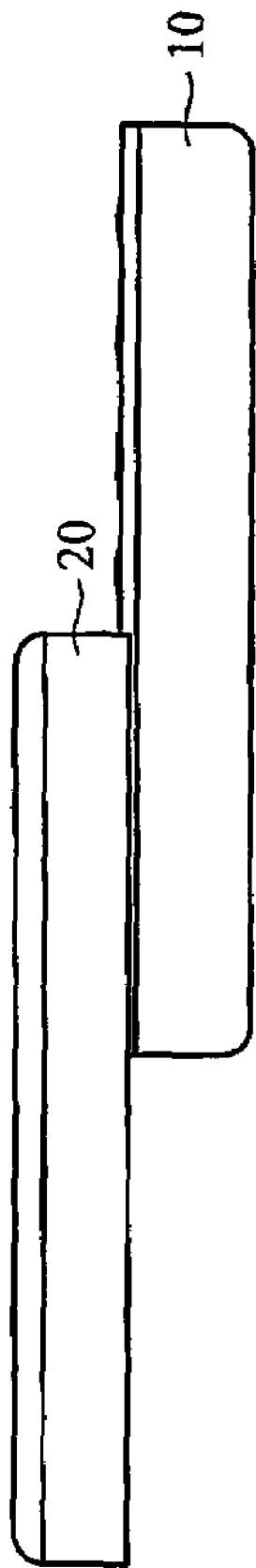
FIG. 2C is a schematic view of the slide apparatus in FIG. 2A with the second member in the second position.

In this case, the second member 20 is to be moved from the first position as shown in FIG. 2A to the second position as shown in FIG. 2C, the second member 20 is moved from the first position to the central position as shown in FIG. 2B, and torque generated by the torque-retaining assembly drives the second member 20 from the central position to the second position. Similarly, the second member 20 is to be moved from the second position as shown in FIG. 2C to the first position as shown in FIG. 2A, the second member 20 is moved from the second position to the central position as shown in FIG. 2B, and torque generated by the torque-retaining assembly drives the second member 20 from the central position to the first position. The substantial structure of the torque-retaining assembly is described later.

Figure 3:
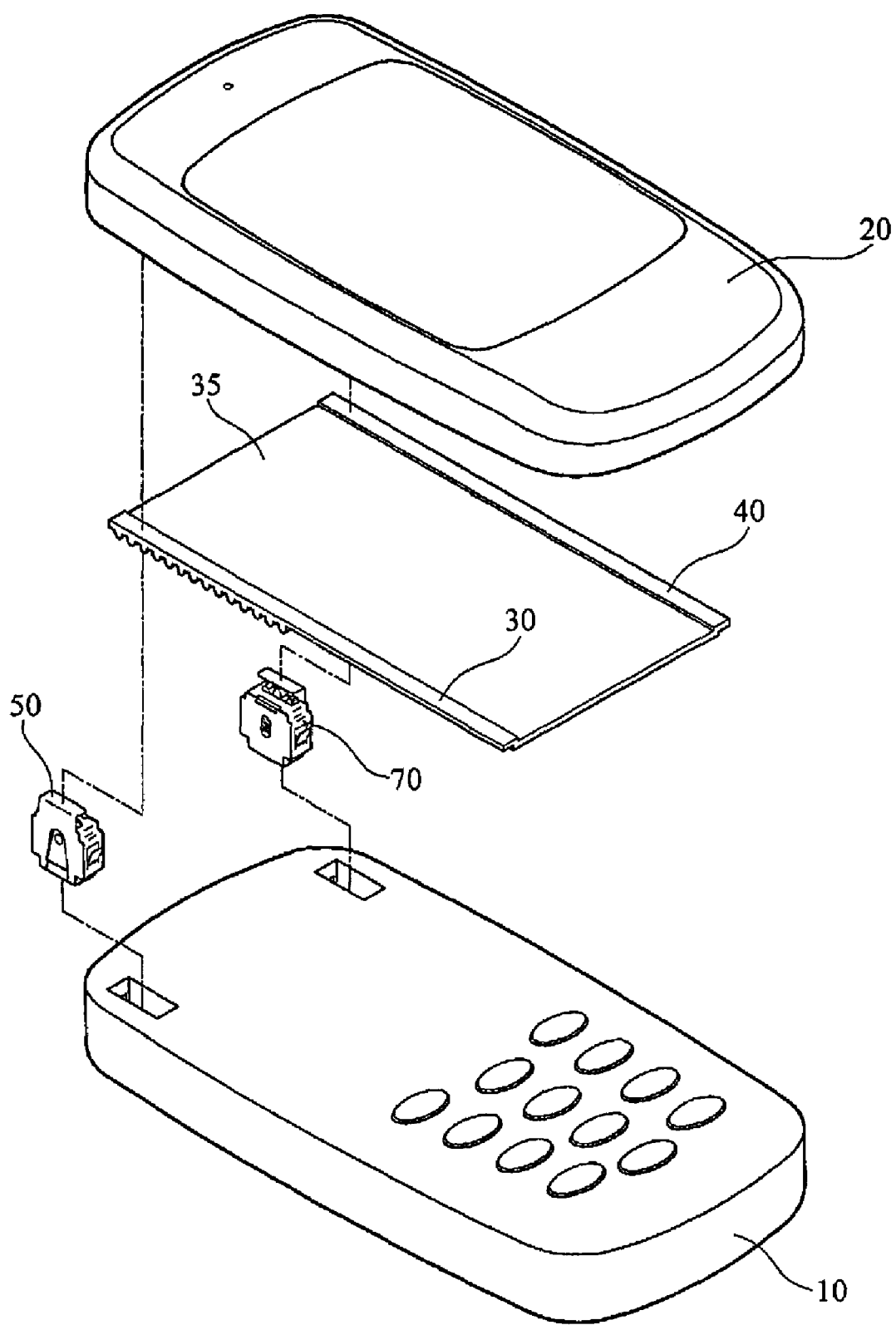
FIG. 3 is a disassembled view of a electronic device of an embodiment of the invention.

FIG. 3 shows another embodiment of an electronic device. The electronic device applies the slide apparatus, which comprises a first member 10, a second member 20, a rack board 35, a first slide module 50 and a second slide module 70. The rack board 35 comprises a first sliding track 30 and a second sliding track 40. The first slide module 50 and the second slide module 70 constitute the torque-retaining assembly.

The first member 10 and the second member 20 can alternatively be a body and a sliding cover of the electronic device. In FIG. 3, for example, the first member 10 is the body and the second member 20 is the sliding cover, but the alternative structure is also applicable. The second member 20 is movable between a first position and a second position in relation to the first member 10, with a central position therebetween, as shown in FIG. 2A to FIG. 2C.

The first slide module 50 and the second slide module 70 are symmetrically disposed on the first member 10. The structures of the two slide modules are hereinafter described in detail.

Figure 4A:
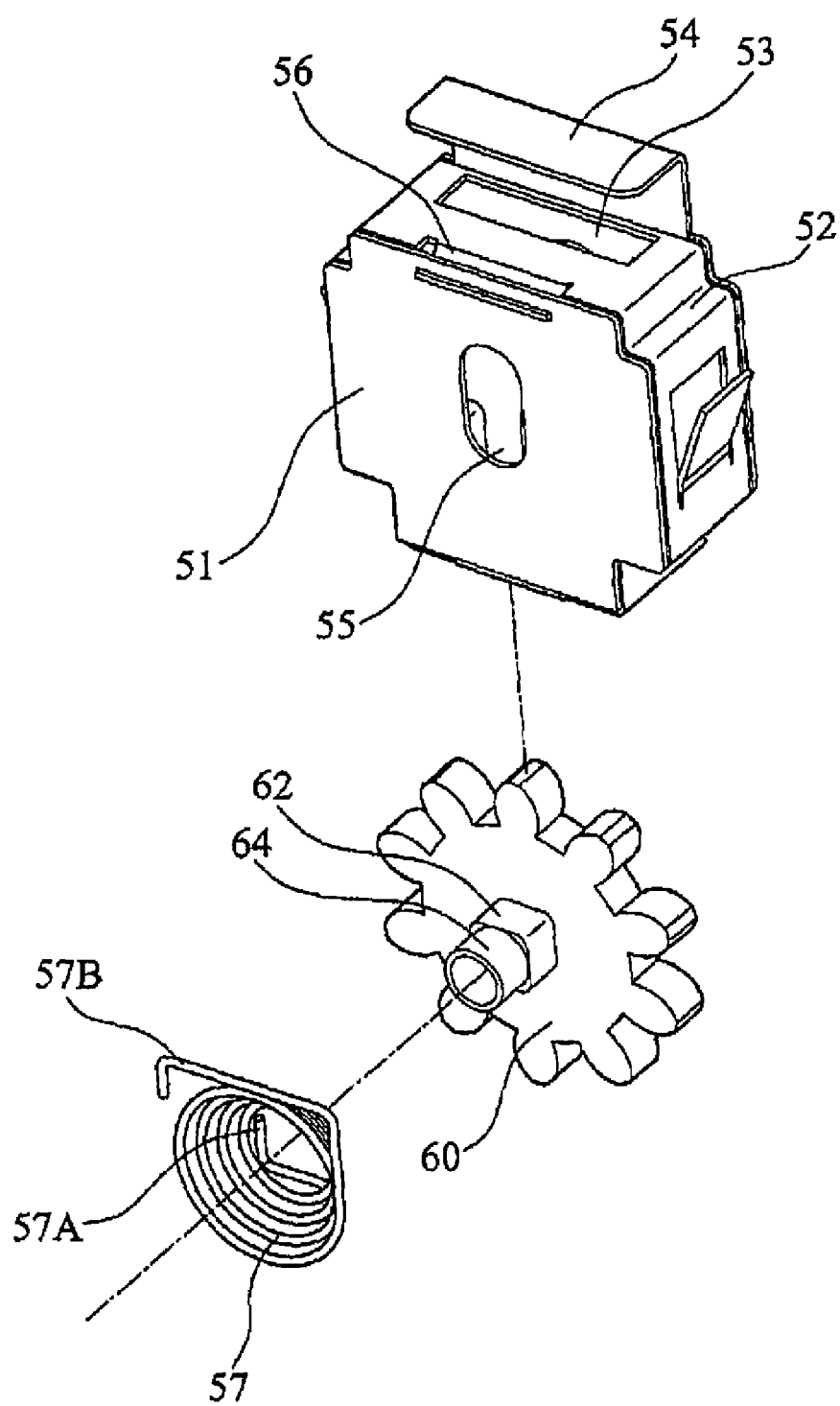
FIG. 4A is a perspective disassembled view of the first slide module.
Figure 4B:
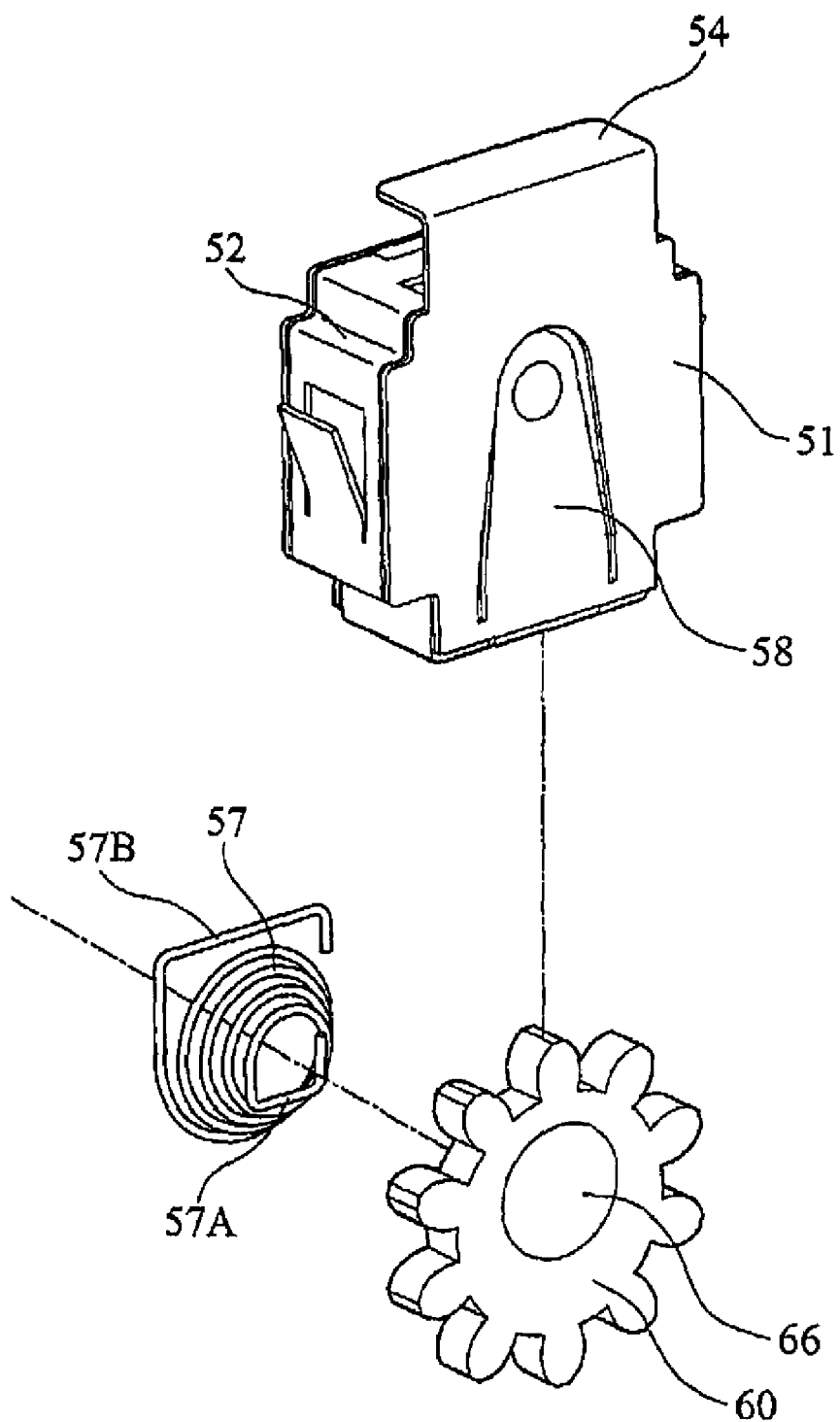
FIG. 4B is another perspective disassembled view of the first slide module.

FIG. 4A and FIG. 4B show the elements of the first slide module 50. The first slide module 50 comprises a first supporting structure 51, a first gear 60, and a first elastic element 57.

The first supporting structure 51 is disposed on the first member 10 to support the first gear 60. The first supporting structure 51 comprises a first limiting portion 52, a first sliding notch 54 and a first guide groove 55. The first guide groove 55 is disposed on a side of the first supporting structure 51 to guide the first gear 60 to rotate and move. Further, the upper portion of the first supporting structure 51 comprises a first opening 53, exposing a part of the first gear 60 and a first engaging notch 56 for fixing the first elastic element 57. On the other side of the first supporting structure 51 opposite to the first guide groove 55, a first elastic sheet 58 is disposed to position the first gear 60.

The first gear 60 is rotatably disposed in the first guide groove 55 by a first rotating shaft 64. The first rotating shaft 64 protrudes from one side of the first gear 60 and connects to a first fixing shaft 62 to fix the first elastic element 57. On the other side of the first gear 60 opposite to the first fixing shaft 62 and the first rotating shaft 64, a first abutting notch 66 is provided to abut the first spring sheet 58 so that the first gear 60 can rotate stably in the first supporting structure 51. Thus, the first gear 60 can move between a first limited position and a first free position along the first guide groove 55.

The first elastic element 57 can be a torsion spring, and comprises a first end 57A and a second end 57B. The first end 57A is fixed to the first fixing shaft 62 of the first gear 60, and the second end 57B is fixed to the first engaging notch 56 of the first supporting structure 51. The first fixing shaft 62 has a non-circular cross section, so the first elastic element 57 is fixed between the first gear 60 and the first supporting structure 51 without rotation. Thus, the first gear 60 forms a first rotating structure rotatable in relation to the first supporting structure 51 to generate a first torque.

Figure 4C:
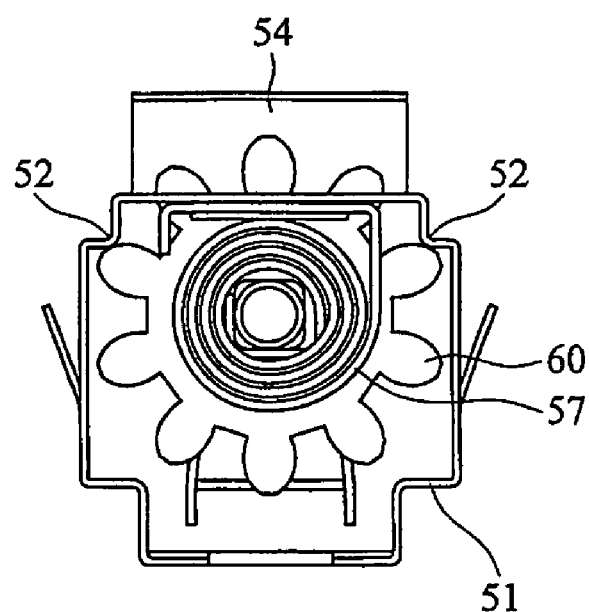
FIG. 4C is a schematic view of the first slide module with the first gear in the first limited position.
Figure 4D:
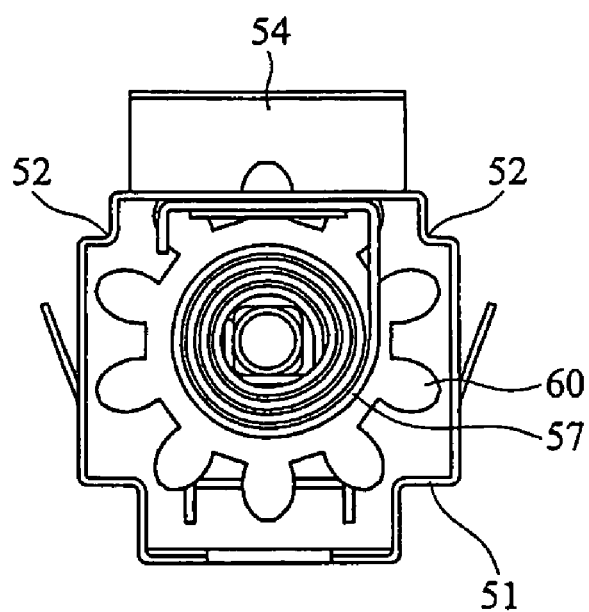
FIG. 4D is a schematic view of the first slide module with the first gear in the first free position.

Referring to FIG. 4C, when the first gear 60 is in the first limited position, the first gear 60 is limited by the first limiting portion 52, and is not rotatable in relation to the first supporting structure 51. Referring to FIG. 4D, when the first gear 60 is in the first free position, the first gear 60 is released from the first limiting portion 52, and is rotatable in relation to the first supporting structure 51. Thus, the original position of the first gear 60 is set in the first limiting position to prevent the first gear 60 from rotating.

Figure 5A:
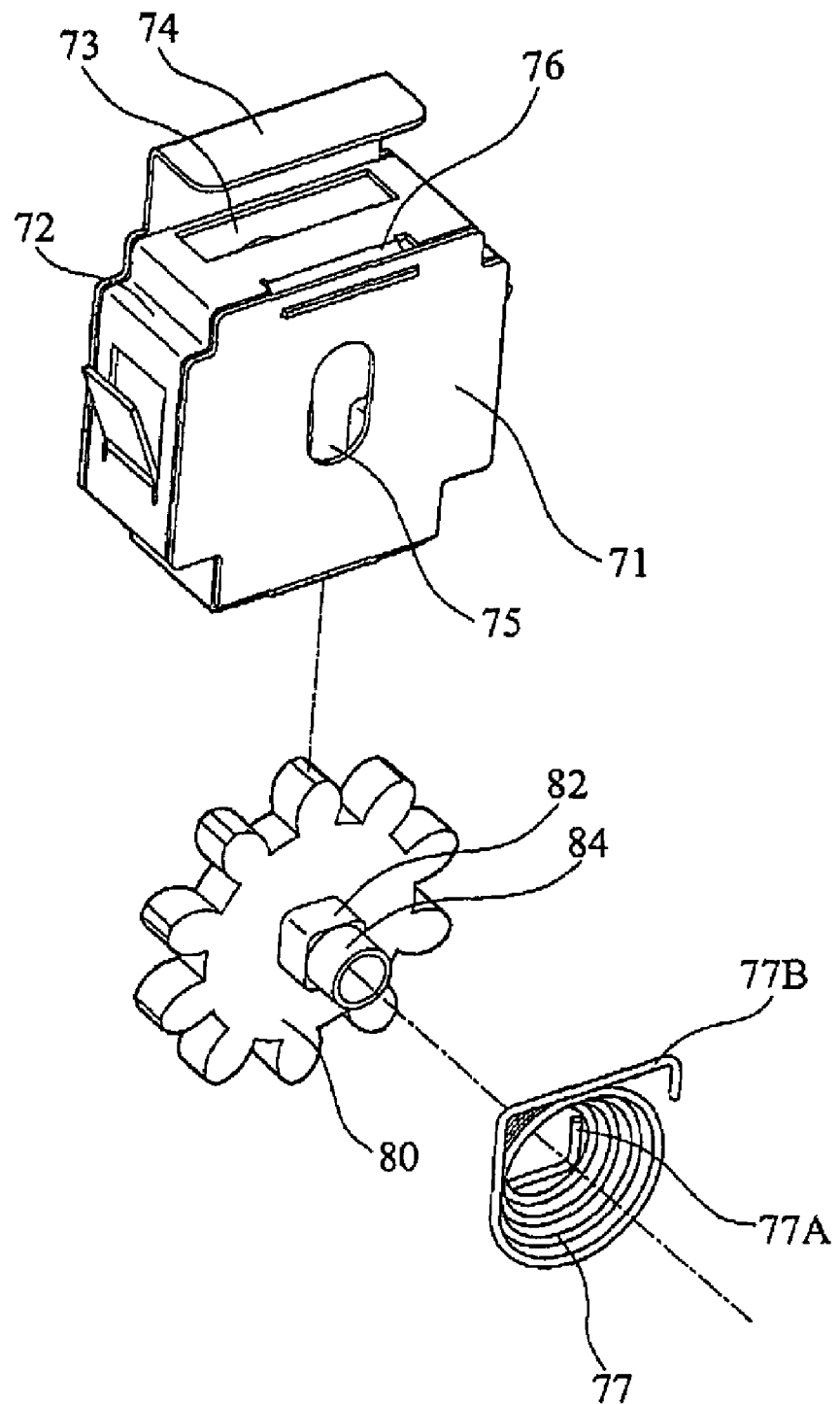
FIG. 5A is a perspective disassembled view of the second slide module.
Figure 5B:
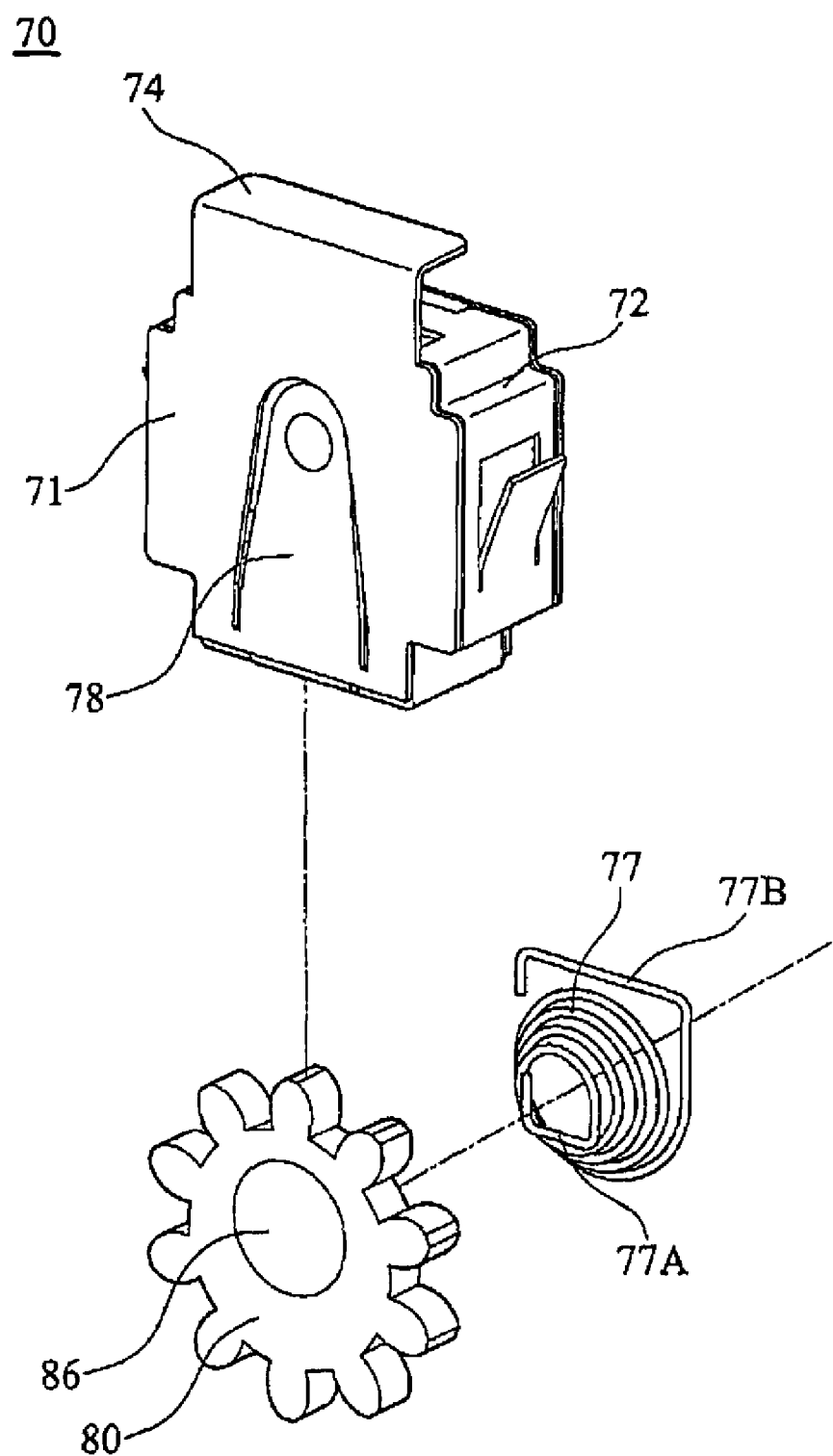
FIG. 5B is another perspective disassembled view of the second slide module.

FIG. 5A and FIG. 5B show the elements of the second slide module 70. The second slide module 70 comprises a second supporting structure 71, a second gear 80, and a second elastic element 77.

The second supporting structure 71 is disposed on the first member 10 to support the second gear 80. The second supporting structure 71 comprises a second limiting portion 72, a second sliding notch 74 and a second guide groove 75. The second guide groove 75 is disposed on a side of the second supporting structure 71 to guide the second gear 80 to rotate and move. Further, the upper portion of the second supporting structure 71 comprises a second opening 73, exposing a part of the second gear 80 and a second engaging notch 76 for fixing the second elastic element 77. On the other side of the second supporting structure 71 opposite to the second guide groove 75, a second elastic sheet 78 is disposed to position the second gear 80.

The second gear 80 is rotatably disposed in the second guide groove 75 by a second rotating shaft 84. The second rotating shaft 84 protrudes from one side of the second gear 80 and connects to a second fixing shaft 82 to fix the second elastic element 77. On the other side of the second gear 80 opposite to the second fixing shaft 82 and the second rotating shaft 84, a second abutting notch 86 is provided to abut the second spring sheet 78 so that the second gear 80 can rotate stably in the second supporting structure 71. Thus, the second gear 80 can move between a second limited position and a second free position along the second guide groove 75.

The second elastic element 77 can be a torsion spring, and comprises a third end 77A and a fourth end 77B. The third end 77A is fixed to the second fixing shaft 82 of the second gear 80, and the fourth end 77B is fixed to the second engaging notch 76 of the second supporting structure 71. The second fixing shaft 82 has a non-circular cross section, so the second elastic element 77 is fixed between the second gear 80 and the second supporting structure 71 without rotation. Thus, the second gear 80 forms a second rotating structure rotatable in relation to the second supporting structure 71 to generate a second torque.

Figure 5C:
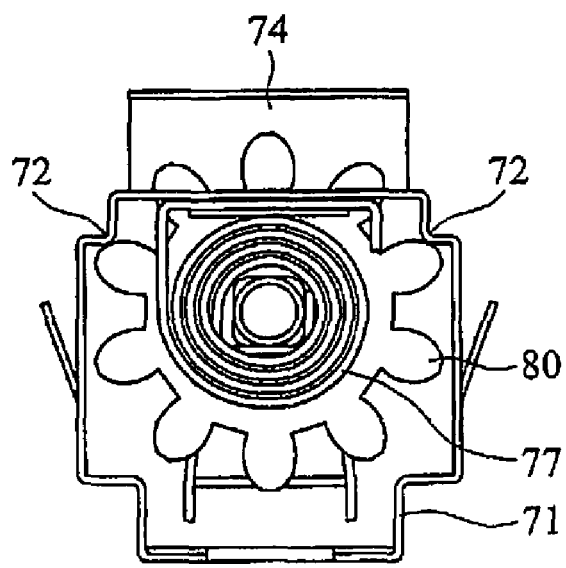
FIG. 5C is a schematic view of the second slide module with the second gear in the second limited position.
Figure 5D:
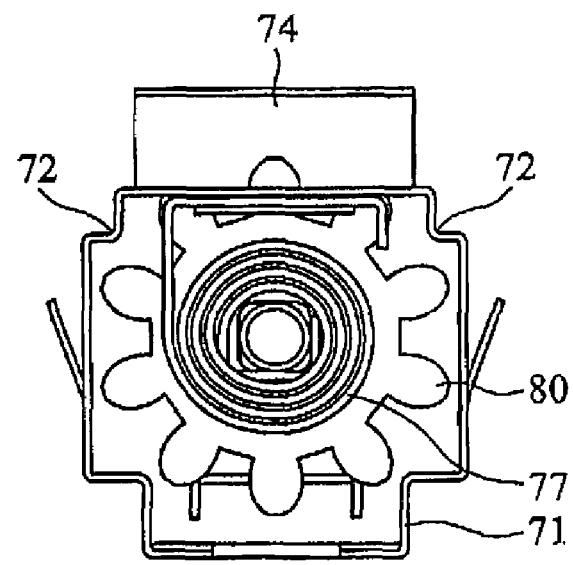
FIG. 5D is a schematic view of the second slide module with the second gear in the second free position.

Referring to FIG. 5C, when the second gear 80 is in the second limited position, the second gear 80 is limited by the second limiting portion 72, and is not rotatable in relation to the second supporting structure 71. Referring to FIG. 5D, when the second gear 80 is in the second free position, the second gear 80 is released from the second limiting portion 72, and is rotatable in relation to the second supporting structure 71. Thus, the original position of the second gear 80 is set in the second limiting position to prevent the second gear 80 from rotating.

Figure 6:
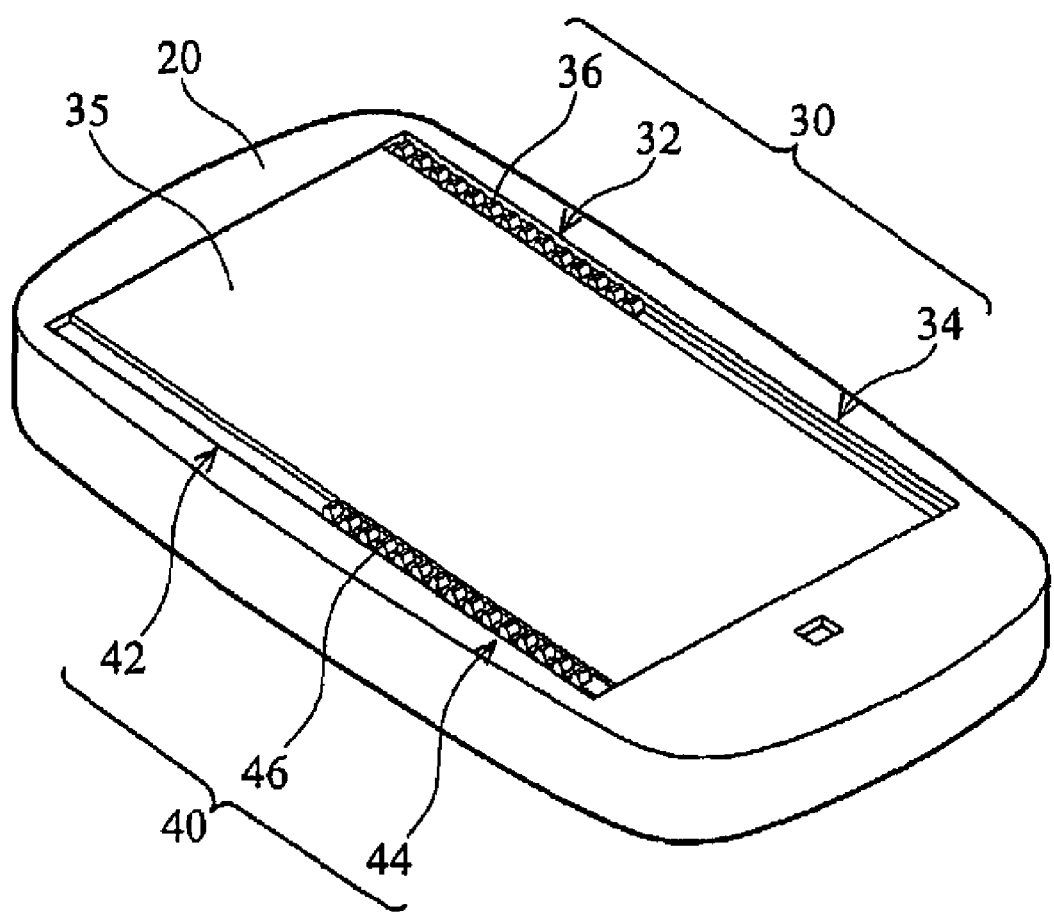
FIG. 6 is a schematic view of assembly of the second member and the rack board.

FIG. 6 shows the assembly of the second member 20 and the rack board 35. The rack board 35 is disposed on a surface of the second member 20 facing the first member 10, and comprises the first sliding track 30 and the second sliding track 40. The first sliding track 30 and the second sliding track 40 are parallel on the second member 20 corresponding to the first sliding notch 54 and the second sliding notch 74. The first sliding track 30 comprises a first track section 32 and a second track section 34, and the second sliding track 40 comprising a third track section 42 and a fourth track section 44. The first track section 32 comprises a first rack 36, and the fourth track section 44 comprises a second rack 46.

The action of the torque-retaining assembly is described hereinafter in detail with respect to FIG. 7A, FIG. 7B and FIG. 7C. It should be noted that the torque-retaining assembly is formed by the first slide module 50 and the second slide module 70. Since the rack board 35 is assembled to the second member 20, FIG. 7A, FIG. 7B and FIG. 7C only show the rack board 35 and omit the second member 20 to simplify the figures.

Figure 7A:
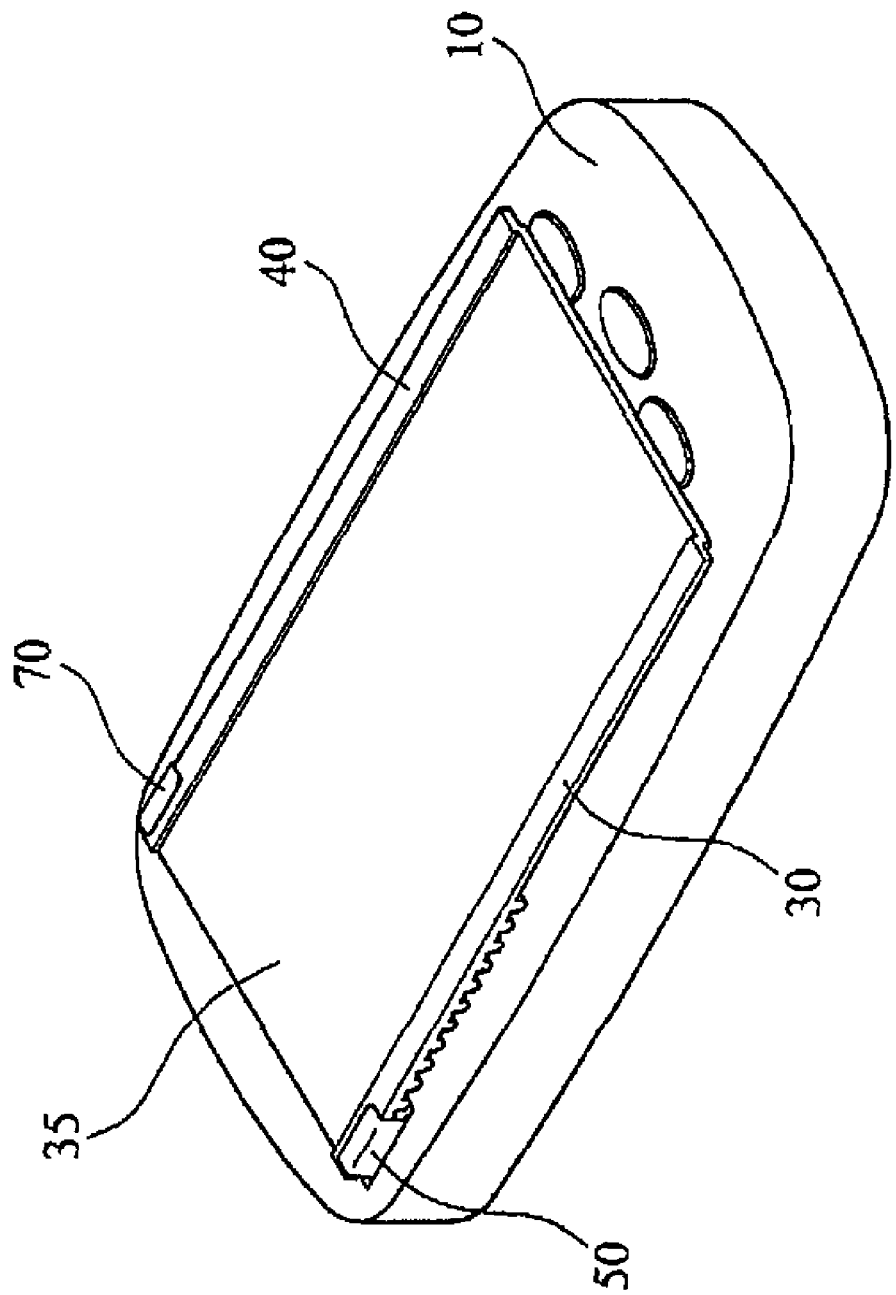
FIG. 7A is a schematic view of the first member and the rack board when the second member is in the first position.

In FIG. 7A, when the second member 20 is in the first position (referring to FIG. 2A) in relation to the first member 10, the first gear 60 corresponds to the first track section 32 of the first sliding track 30, and the second gear 80 corresponds to the third track section 42 of the second sliding track 40.

Figure 7B:
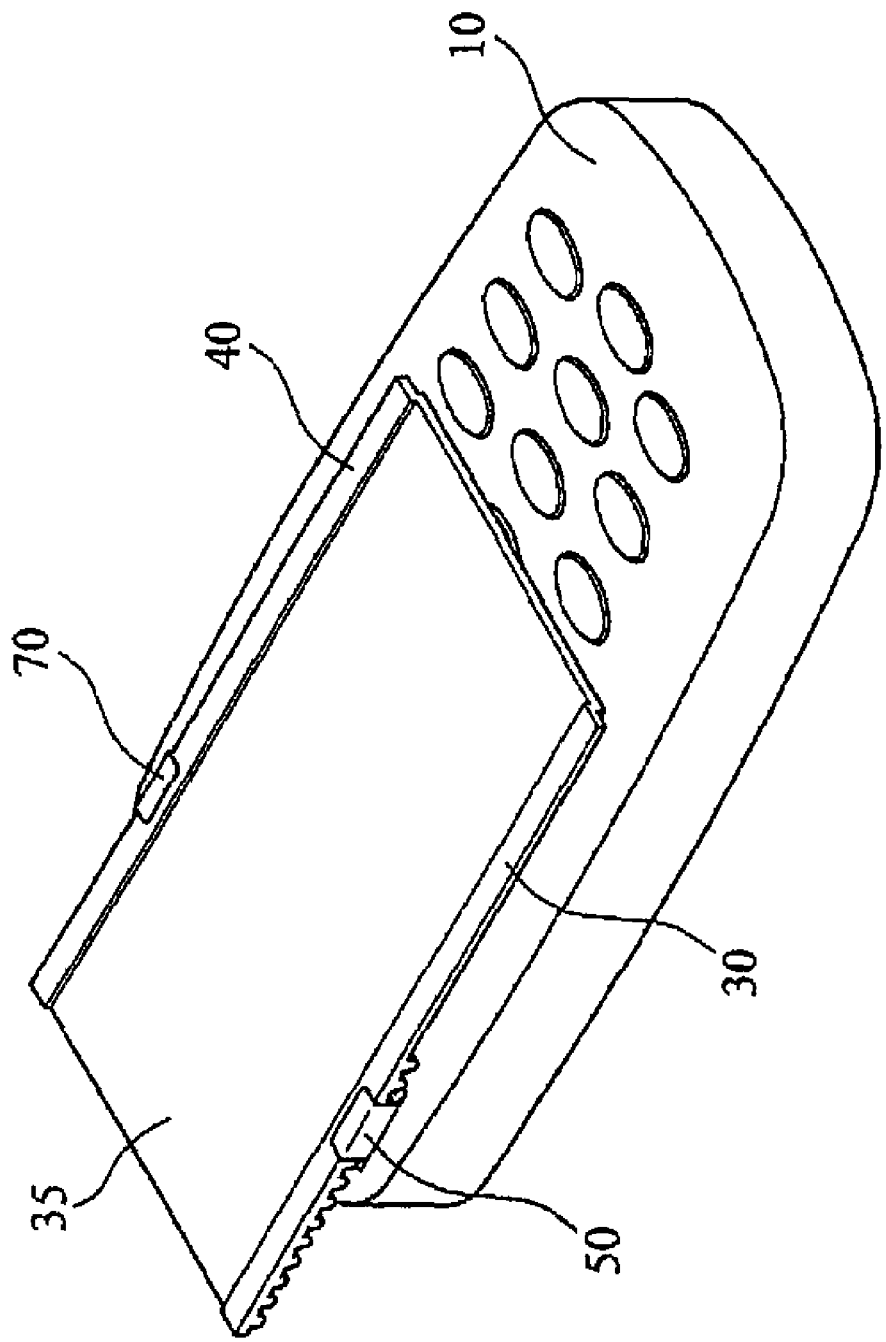
FIG. 7B is a schematic view of the first member and the rack board when the second member is in the central position.

In FIG. 7B, when the second member 20 moves to the central position (referring to FIG. 2B) in relation to the first member 10, the rack board 35 moves with the second member 20 such that the first gear 60 corresponds to the middle portion of the first track section 32 and the second track section 34 of the first sliding track 30, and the second gear 80 corresponds to the middle portion of the third track section 42 and the fourth track section 44 of the second sliding track 40.

Figure 7C:
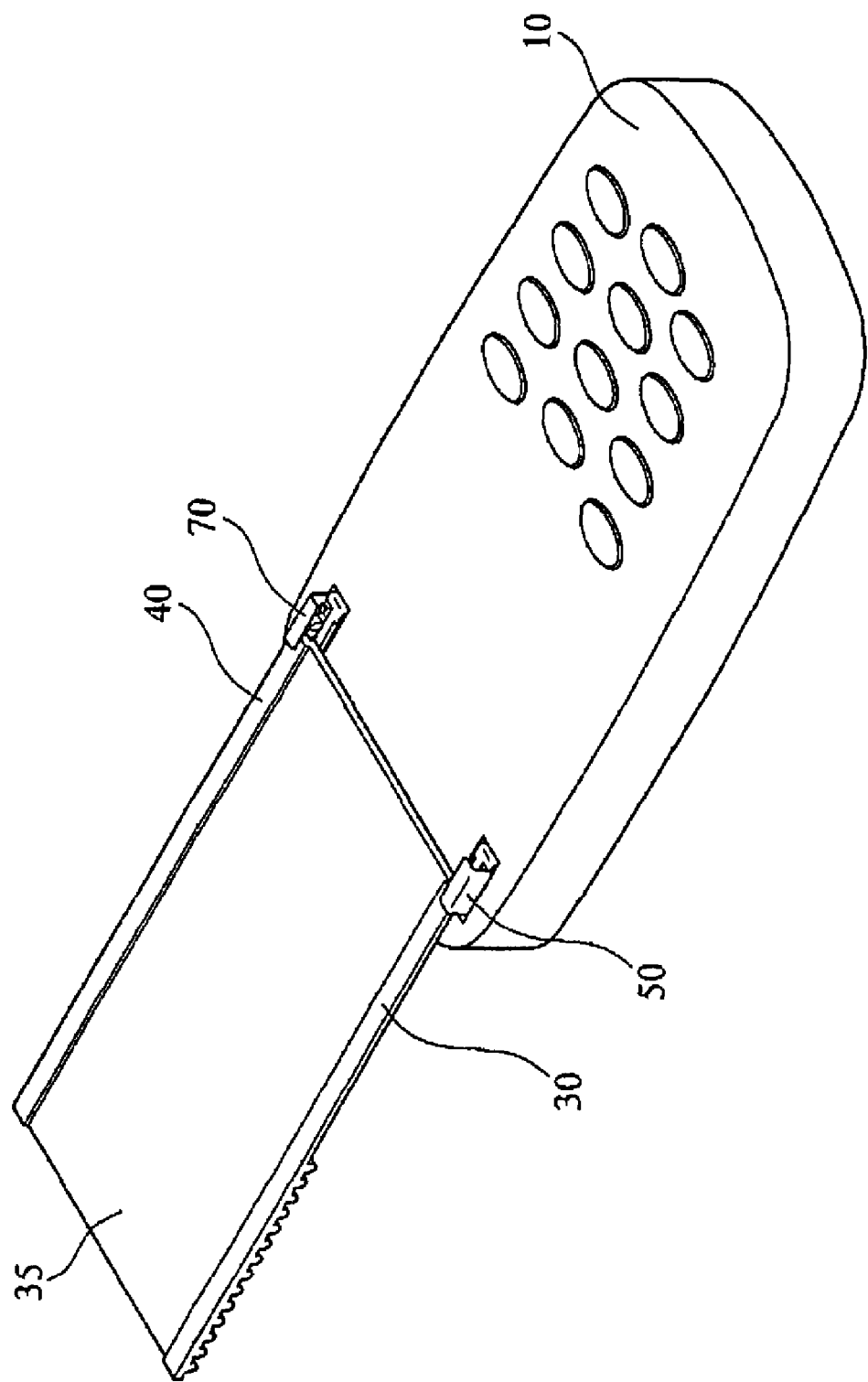
FIG. 7C is a schematic view of the first member and the rack board when the second member is in the second position.

Further, in FIG. 7C, when the second member 20 is in the second position (referring to FIG. 2C) in relation to the first member 10, the first gear 60 corresponds to the second track section 34 of the first sliding track 30, and the second gear 80 corresponds to the fourth track section 44 of the second sliding track 40.

Accordingly, when the second member 20 is between the first position (as shown in FIG. 7A) and the central position (as shown in FIG. 7B) in relation to the first member 10, the first gear 60 corresponds to the first track section 32, and the second gear 80 corresponds to the third track section 42. Since the first track section 32 comprises the first rack 36 and the third track section 42 comprises no rack, the first gear 60 engages with the first rack 46, moving the first gear 60 to the first free position, and the second gear 80 is in the second limited position. Thus, the first gear 60 (i.e. the first rotating structure) is rotatable, and the second gear 80 (i.e. the second rotating structure) is not.

Further, when the second member 20 is between the central position (as shown in FIG. 7B) and the second position (as shown in FIG. 7C) in relation to the first member 10, the first gear 60 corresponds to the second track section 34, and the second gear 80 corresponds to the fourth track section 44. Since the fourth track section 44 comprises the second rack 46 and the second track section 34 comprises no rack, the second gear 80 engages with the second rack 46, moving the second gear 80 to the second free position, and the first gear 60 is in the first limited position. Thus, the first gear 60 (i.e. the first rotating structure) is not rotatable, and the second gear 80 (i.e. the second rotating structure) is rotatable.

In other words, when the second member 20 is to be moved from the first position as shown in FIG. 7A to the second position as shown in FIG. 7C, the second member 20 is moved from the first position to the central position as shown in FIG. 7B. Since the first gear 60 (i.e. the first rotating structure) is rotatable and the second gear 80 (i.e. the second rotating structure) is not when the second member 20 is between the first position and the central position, the first elastic element 57 connected to the first gear 60 generates a first torque. When the second member 20 passes the central position, the first gear 60 (i.e. the first rotating structure) is not rotatable, and the second gear 80 (i.e. the second rotating structure) is rotatable. Thus, the first torque is stored, and a second torque generated and stored in the second elastic element 77 is released, driving the second gear 80 to rotate and moves the second member 20 from the central position to the second position. Thus, no external force is required.

Similarly, when the second member 20 is to be moved from the second position as shown in FIG. 7C to the first position as shown in FIG. 7A, the second member 20 is moved from the second position to the central position as shown in FIG. 7B. Since the first gear 60 (i.e. the first rotating structure) is not rotatable and the second gear 80 (i.e. the second rotating structure) is rotatable when the second member 20 is between the central position and the second position, the second elastic element 77 connected to the second gear 80 generates the second torque. When the second member 20 passes the central position, the first gear 60 (i.e. the first rotating structure) is rotatable and the second gear 80 (i.e. the second rotating structure) is not. Thus, the second torque is stored, and the first torque generated and stored in the first elastic element 57 is released, driving the first gear 60 to rotate and moves the second member 20 from the central position to the first position. Thus, no external force is required.

It should be noted that the first elastic element 57 and the second elastic element 77 sustain torsion in opposite directions such that the first torque and the second torque drive the second member 20 in opposite directions. However, the elastic elements are not limited to the torsion springs disclosed here.

Further, while the first sliding track 30 and the second sliding track 40 are disclosed as an integral rack board 35 as shown in FIG. 6, they can be individual and separate elements, respectively disposed on the second member 20.

Further, in the embodiments disclosed, the first position is a closed position, and the second position is an open position. However, the first and second positions can be any positions, not being limited to the embodiments and the figures.

Further, in the embodiments disclosed, the first slide module 50 and the second slide module 70 are symmetrical. However, the first slide module 50 and the second slide module 70 can be formed by different structures.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A slide apparatus, comprising:
 a first member;
 a second member movable between a first position and a second position in relation to the first member, with a central position therebetween;
 a first slide module disposed on the first member, comprising:
   a first rotating structure rotatable when the second member is between the first position and the central position and not rotatable when the second member is between the central position and the second position; and
   a first elastic element comprising a first end fixed to the first rotating structure and a second end fixed to the first member; and
 a second slide module disposed on the first member, comprising:
   a second rotating structure not rotatable when the second member is between the first position and the central position and rotatable when the second member is between the central position and the second position; and
   a second elastic element comprising a third end fixed to the second rotating structure and a fourth end fixed to the first member;
 wherein when the second member moves from the first position to the central position in relation to the first member by a first external force, the first rotating structure rotates to generate a first torque in the first elastic element, driving the second member from the central position to the first position; and
 when the second member moves from the second position to the central position in relation to the first member by a second external force, the second rotating structure rotates to generate a second torque in the second elastic element, driving the second member from the central position to the second position.

2. The slide apparatus as claimed in claim 1, wherein the first rotating structure is a first gear, and the second rotating structure is a second gear.

3. The slide apparatus as claimed in claim 1, wherein the first elastic element and the second elastic element are torsion springs.

4. The slide apparatus as claimed in claim 1, wherein the first elastic element and the second elastic element sustain torsion in opposite directions.

5. The slide apparatus as claimed in claim 1, wherein the first member is a body, and the second member is a sliding cover.

6. The slide apparatus as claimed in claim 1, wherein the second member is a body, and the first member is a sliding cover.

7. A slide apparatus, comprising:
 a first member;
 a second member movable between a first position and a second position in relation to the first member, with a central position therebetween; and a torque-retaining assembly disposed between the first member and the second member;

wherein when the second member moves from the first position to the central position in relation to the first member by a first external force, the torque-retaining assembly generates a first torque, driving the second member from the central position to the first position; and when the second member moves from the second position to the central position in relation to the first member by a second external force, the torque-retaining assembly generates a second torque, driving the second member from the central position to the second position.

8. The slide apparatus as claimed in claim 7, wherein the torque-retaining assembly comprises:

a first slide module disposed on the first member, comprising:

a first rotating structure rotatable when the second member is between the first position and the central position and not rotatable when the second member is between the central position and the second position;

a first supporting structure supporting the first rotating structure; and a first elastic element comprising a first end fixed to the first rotating structure and a second end fixed to the first supporting structure; and a second slide module disposed on the first member, comprising:

a second rotating structure not rotatable when the second member is between the first position and the central position and rotatable when the second member is between the central position and the second position;

a second supporting structure supporting the second rotating structure; and a second elastic element comprising a third end fixed to the second rotating structure and a fourth end fixed to the second supporting structure;

wherein when the second member moves from the first position to the central position in relation to the first member by a first external force, the first rotating structure rotates to generate the first torque in the first elastic element, driving the second member from the central position to the first position; and when the second member moves from the second position to the central position in relation to the first member by a second external force, the second rotating structure rotates to generate the second torque in the second elastic element, driving the second member from the central position to the second position.

9. An electronic device, comprising:

a first member;

a second member movable between a first position and a second position in relation to the first member, with a central position therebetween;

a first slide module disposed on the first member, comprising:

a first supporting structure comprising a first sliding notch, a first limiting portion and a first guide groove;

a first gear disposed in the first supporting structure and movable between a first limited position and a first free position along the first guide groove, wherein the first gear is not rotatable when limited by the first limiting portion and in the first limited position and rotatable when the first gear is in the first free position; and a first elastic element comprising a first end fixed to the first gear and a second end fixed to the first supporting structure;

a first sliding track disposed on the second member and corresponding to the first sliding notch, the first sliding track comprising a first track section and a second track section, the first track section comprising a first rack;

a second slide module disposed on the first member, comprising:

a second supporting structure comprising a second sliding notch, a second limiting portion and a second guide groove;

a second gear disposed in the second supporting structure and movable between a second limited position and a second free position along the second guide groove, wherein the second gear is not rotatable when limited by the second limiting portion and in the second limited position and rotatable when the second gear is in the second free position; and a second elastic element comprising a third end fixed to the second gear and a fourth end fixed to the second supporting structure;

a second sliding track disposed on the second member and corresponding to the second sliding notch, the second sliding track comprising a third track section and a fourth track section, the fourth track section comprising a second rack;

wherein when the second member is between the first position and the central position in relation to the first member, the first gear corresponds to the first track section and engages with the first rack, moving the first gear to the first free position, and the second gear corresponds to the third track section and is in the second limited position; and when the second member is between the central position and the second position in relation to the first member, the first gear corresponds to the second track section and is in the first limited position, and the second gear corresponds to the fourth track section and engages with the second rack, moving the second gear to the second free position.

10. The electronic device as claimed in claim 9, wherein the first gear comprises a first rotating shaft rotatably disposed in the first guide groove, and the second gear comprises a second rotating shaft rotatably disposed in the second guide groove.

11. The electronic device as claimed in claim 9, wherein the first gear comprises a first fixing shaft fixing the first end of the first elastic element, and the second gear comprises a second fixing shaft fixing the third end of the second elastic element.

12. The electronic device as claimed in claim 11, wherein the first fixing shaft and the second fixing shaft have non-circular cross sections.

13. The electronic device as claimed in claim 9, wherein the first supporting structure comprises a first engaging notch fixing the second end of the first elastic element, and the second supporting structure comprises a second engaging notch fixing the fourth end of the second elastic element.

14. The electronic device as claimed in claim 9, wherein the first gear comprises a first abutting notch, the second gear comprises a second abutting notch, the first supporting structure comprises a first spring sheet abutting the first abutting notch, and the second supporting structure comprises a second spring sheet abutting the second abutting notch.

15. The electronic device as claimed in claim 9, wherein the first supporting structure comprises a first opening, exposing a part of the first gear, and the second supporting structure comprises a second opening, exposing a part of the second gear.

16. The electronic device as claimed in claim 9, wherein the first elastic element and the second elastic element are torsion springs.

17. The electronic device as claimed in claim 9, wherein the first elastic element and the second elastic element sustain torsion in opposite directions.

18. A slide module, comprising:
   a supporting structure comprising a limiting portion and a guide groove;
   a rotating structure disposed in the supporting structure and movable between a limited position and a free position along the guide groove, wherein the rotating structure is not rotatable when limited by the limiting portion and in the limited position and rotatable when the rotating structure is in the free position; and
   an elastic element comprising two ends, one end fixed to the rotating structure and the other end fixed to the supporting structure.

19. The slide module as claimed in claim 18, wherein the rotating structure is a gear.

20. The slide module as claimed in claim 18, wherein the elastic element is a torsion spring.

* * * * *